:(12) United States Patent
Ryder

(10) Patent No.: US 12,045,255 B2
(45) Date of Patent: Jul. 23, 2024

(54) DATA STORAGE MANAGEMENT AND SYNCHRONIZATION

(71) Applicant: Apple Inc., Cupertino, CA (US)

(72) Inventor: Scott W. Ryder, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 720 days.

(21) Appl. No.: 14/035,265

(22) Filed: Sep. 24, 2013

(65) Prior Publication Data

US 2014/0095436 A1 Apr. 3, 2014

Related U.S. Application Data

(60) Provisional application No. 61/707,737, filed on Sep. 28, 2012.

(51) Int. Cl.
*G06F 16/27* (2019.01)
*G06F 21/60* (2013.01)
*G06F 21/62* (2013.01)

(52) U.S. Cl.
CPC ............ *G06F 16/273* (2019.01); *G06F 16/27* (2019.01); *G06F 21/604* (2013.01); *G06F 21/6218* (2013.01)

(58) Field of Classification Search
CPC ............ G06F 17/30575; G06F 21/604; G06F 21/6218; G06F 21/60; G06F 21/6209; G06F 21/629; G06F 21/64
USPC ............ 707/624, 999.001; 715/810; 711/113
See application file for complete search history.

(56) References Cited

U.S. PATENT DOCUMENTS

| 4,104,718 | A | * | 8/1978 | Poublan | G06F 12/1491 |
| 5,216,604 | A | * | 6/1993 | Sakata | G06F 40/166 |
| | | | | | 715/202 |
| 5,551,023 | A | * | 8/1996 | Alonso | G06F 17/30362 |
| | | | | | 707/703 |
| 6,591,265 | B1 | * | 7/2003 | Erickson | G06F 21/316 |
| 8,532,675 | B1 | * | 9/2013 | Pasquero | H04M 1/72572 |
| | | | | | 345/158 |
| 8,768,972 | B1 | * | 7/2014 | Wong | G06F 17/30362 |
| | | | | | 707/802 |
| 2002/0144153 | A1 | * | 10/2002 | LeVine | G06F 21/14 |
| | | | | | 726/33 |
| 2004/0103147 | A1 | * | 5/2004 | Flesher | G06F 17/30575 |
| | | | | | 709/204 |
| 2005/0044396 | A1 | * | 2/2005 | Vogel | G06F 21/6218 |
| | | | | | 726/6 |
| 2006/0053181 | A1 | * | 3/2006 | Anand | G06F 11/1469 |

(Continued)

OTHER PUBLICATIONS

HarperCollins Computer Dictionary definition of edit.*
Active Definition American Heritage Dictionary 2002.*
Data and Edit definitions Microsoft Computer Dictionary.*

*Primary Examiner* — Tony Mahmoudi
*Assistant Examiner* — Kamal K Dewan
(74) *Attorney, Agent, or Firm* — FLETCHER YODER PC

(57) ABSTRACT

The described embodiments include a computing device that enables the placement of data guards on data items (e.g., files, data in an application, etc.). The data guard is associated with a conflict priority that is used to determine users that are permitted to make changes to the data item. When the data guard has been placed, the data item is visually identified (e.g., when displayed on a display) as being guarded. In addition, the computing device includes various mechanisms for enabling synchronization of data items between computing devices.

18 Claims, 12 Drawing Sheets

(56) References Cited

U.S. PATENT DOCUMENTS

| | | | |
|---|---|---|---|
| 2006/0123010 A1* | 6/2006 | Landry | G06F 16/25 |
| 2006/0123065 A1* | 6/2006 | Rapp | G06F 17/30362 |
| 2006/0195777 A1* | 8/2006 | Davis | G06F 40/14 715/209 |
| 2007/0061382 A1* | 3/2007 | Davis | G06F 16/80 |
| 2007/0100755 A1* | 5/2007 | Kragt | G06F 21/10 705/51 |
| 2007/0288767 A1* | 12/2007 | Boyer | G06F 21/64 713/194 |
| 2008/0222570 A1* | 9/2008 | MacLaurin | G06F 17/30554 715/839 |
| 2008/0222734 A1* | 9/2008 | Redlich | G06F 21/577 726/26 |
| 2008/0306954 A1* | 12/2008 | Hornqvist | G06F 21/6218 |
| 2009/0192839 A1* | 7/2009 | Ramamoorthy | G06Q 10/06 705/317 |
| 2010/0095122 A1* | 4/2010 | Bettger | H04L 12/1831 713/170 |
| 2010/0114985 A1* | 5/2010 | Chaudhary | G06F 17/3002 707/803 |
| 2010/0218118 A1* | 8/2010 | Bronkema | G06F 19/3481 715/751 |
| 2010/0299308 A1* | 11/2010 | Prasad | G06F 17/30206 707/622 |
| 2011/0247081 A1* | 10/2011 | Shelton | G06F 21/6218 726/28 |
| 2011/0321122 A1* | 12/2011 | Mwangi | G06F 21/6245 726/1 |
| 2012/0131581 A1* | 5/2012 | Zielinski | G06Q 10/10 718/100 |
| 2012/0240238 A1* | 9/2012 | Gates | H04N 21/41407 726/26 |
| 2013/0031595 A1* | 1/2013 | Nevstruev | G06F 21/6245 726/1 |
| 2013/0318589 A1* | 11/2013 | Ford | H04L 63/08 726/7 |
| 2014/0013445 A1* | 1/2014 | Caskey | G06Q 50/22 726/28 |
| 2016/0119309 A1* | 4/2016 | Sawicki | G06F 21/10 726/4 |

\* cited by examiner

Task One

Task Two

DATA STORAGE MANAGEMENT AND SYNCHRONIZATION

RELATED CASES

This application is a non-provisional application from, and hereby claims priority under 35 U.S.C. § 119 to, pending U.S. provisional patent application No. 61/707,737, titled "Data Management," by Scott. W. Ryder, which was filed on 28 Sep. 2012, and which is herein incorporated by reference.

BACKGROUND

This specification relates to data management.

Users can store data in a remote location, e.g., a network storage location. Users can also transfer data between devices. Typically, users share data with other users through file transfer or file sharing. For example, a user can identify a particular file to send to others, e.g., by e-mail or using a file transfer protocol. Conventional file sharing allows other users, e.g., on a network, to access files, however the files typically remain at their original location. Alternatively, files can be checked out from their original storage location by others, but typically the only user that can modify the file is the one that checked the file out.

SUMMARY

This specification describes technologies relating to data management and synchronization.

Particular embodiments of the subject matter described in this specification can be implemented so as to realize one or more of the following advantages.

Specifying data guards allows users to provide notice of editing activity being performed on a data item and prioritizing those changes. Data guards can be automatically generated based on user activity, protecting the user's changes without their explicitly setting data guards. Using task based coordinating nodes allows different coordinating nodes to be selected for different tasks based on which node is appropriate for coordinating that task. A coordinating node can determine that later received changes are blocked due to an earlier received change. Making a corresponding negative delta for each positive delta change to a data item allows for changes to be undone at a later time by applying one or more of the negative deltas to the current state of the data item. Using compressed representations of data items showing changes and dependencies allows for fine grained conflict detection. Indexing storage volumes with addressable fingerprints allows the volume and data items stored in the volume to be accessed anywhere on the network even if the location of the storage volume changes.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
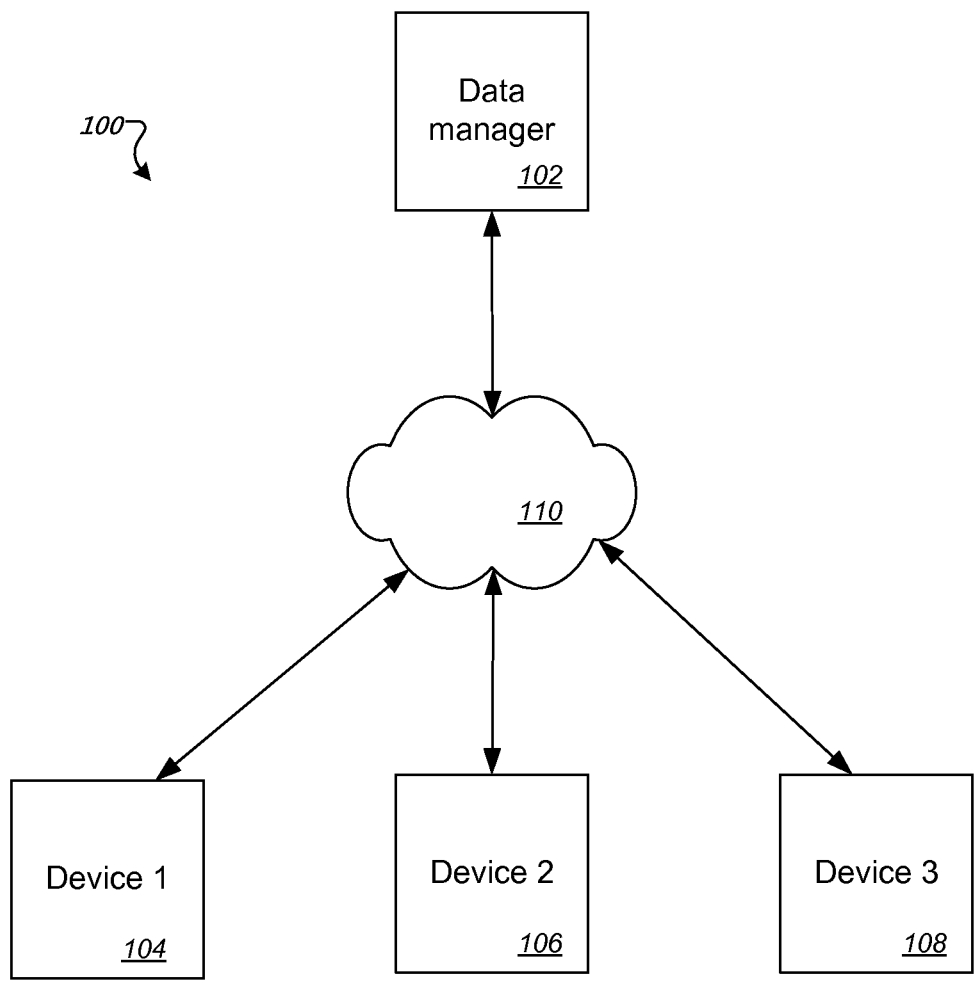
FIG. 1 is diagram of an example system for data management.

FIG. 1 is diagram of an example system 100 for data management. The system 100 provides, for example, both data storage and data synchronization between devices. In particular, system 100 includes a data manager 102 and devices 104, 106, and 108. The data manager 102 and devices 104, 106, and 108 are communicatively coupled to a network 110.

The network 110, such as a local area network (LAN), wide area network (WAN), the Internet, one or more telephony networks or a combination thereof, connects the data manger 102 and the devices 104, 106, and 108.

The data manager 102 can be one or more computing devices configured to store data for a number of devices as well as provide services including, for example, applications (e.g., e-mail), or data computation. The data manager 102 can also provide data management including, for example, data synchronization between associated devices.

In some implementations, the data manager 102 includes one or more servers or other computers. In some other implementations, the data manager 102 includes a cloud computing architecture. Cloud computing refers to network-based computing in which networked computing devices provide resources and data storage to end users, e.g., client devices such as devices 104, 106, and 108. Cloud computing can provide computational and data management services as well as cloud based software applications that users can access through the network 110.

The devices 104, 106, and 108 can be general or specific use computing devices used by different, or the same users. They may be any type of appropriate computing devices that are capable sending and receiving information through the network 110. Examples of computing devices include, for example, mobile devices (e.g. smartphones and tablets), desktop computing devices (e.g. desktop, laptop, or server systems), and specialty computer devices (e.g. in-dash navigation and entertainment systems in an automobile, television media centers).

In some implementations, a single user can have multiple devices, e.g., a mobile device, a tablet device, and a desktop device. Alternatively, in some implementations, a user can choose to share access to one or more devices with one or more other users, e.g., based on particular granted permissions.

In some other implementations, the devices 104, 106, and 108 are associated with distinct users. Particular data, however, may be shared between the devices 104, 106, and 108. For example, documents can be collaboratively shared between colleagues. Friends can share images or other media files, etc.

Guards

Users can share a particular data item with one or more other users. For example, the data item can be a particular file and the users can share the file such that each user can access and edit the contents of the file. The data item can be synchronized between users, e.g., using the data manager 102 of FIG. 1. In some implementations, two different users can modify the data item at the same time, e.g., a shared spreadsheet document. In such cases, conflicts can sometimes occur between different changes entered by different users. Additionally, in some implementations, a user can modify a data item while disconnected from the network, for example, during an airplane flight. When synchronizing the data item after reconnecting to the network, conflicts can also be detected based on activity of other users editing the data item while the user was disconnected from the network.

Figures 2, 3:
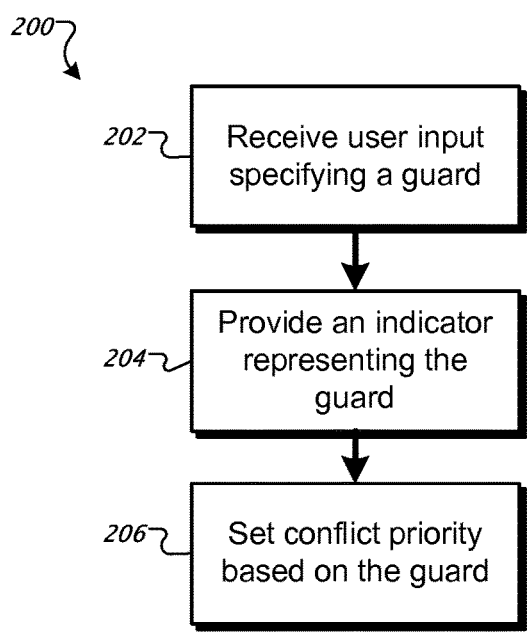
FIG. 2 is a flow diagram of an example process for using data guards.
FIG. 3 is a flow diagram of an example process for using data guards.

FIG. 2 is a flow diagram of an example process 200 for using data guards. For convenience, the process 200 will be described with respect to a system of one or more computing devices that performs the process 200.

The system receives a user input specifying a data guard 202. A data guard is a notification scheme in which one or more associated data items are identified as being guarded. For example, if a user sets a guard on a document, other users that the document is shared with may receive notification that the guard is in place. A user can specify a data guard for one or more data items, e.g., one or more files. Additionally, the data guard can be the data item as a whole or for or one or more portions within the data item. For example, a user of a shared presentation document can specify a data guard for particular slides of the presentation document rather than the presentation document as a whole.

In some implementations, one or more menus presented by the user's device allow the user to specify the data guard as well as one or more parameters for the data guard. The parameters can include, for example, a duration for the data guard to be in place.

The system provides an indicator representing the data guard when presenting the associated data item (204). For example, when presenting a file system interface (e.g., a graphical user interface window) including one or more data items, the representation of data items having associated data guards can include a visual indicator. In some implementations, the visual indicator can be graphic overlying a portion of an icon representation of the data item (e.g., a red dot, or an "X"). In some other implementations, the visual indicator is a change in the presentation of the visual representation of the data item, e.g., color or shading. In some implementations, a pop-up warning or other notification is presented if a user attempts to open a guarded data item or edit the guarded data item. Similarly, if a portion of a data item is guarded, the indicator can be presented within an application interface in which the data item is open. For example, in a presentation application, a data item can include a number of presentation slides. If particular slides are guarded, those slides can include a visual indicator within the application interface.

The system sets a conflict priority based on the data guard (206). The conflict priority can establish a conflict winner that overrides any other conflict resolution processes employed by the system. In particular, in some implementations, if a user established a data guard on a data item that is not already guarded by another user, any changes made by other users while the data guard is in place will not be retained. For example, the data guard provides notification but may not prevent other users from accessing and editing the guarded data item. However, these changes may not be maintained and synchronized across shared devices.

In some implementations, changes to a guarded data item that conflict with the edits made by the user that set the guard will be discarded. In some other implementations, any changes made to a guarded document by a user other than the user that set the data guard, whether directly in conflict or not, will be discarded. In some alternative implementations, users can modify guarded data items; however, new versions with the modifications are created. A user can set a guard, for example, for a data item or portion of the data item before disconnecting from the network, e.g., for a plane flight, such that the user can make changes to the data item that will be guarded until they rejoin the network and synchronize the data item.

When the data guard is directed to a portion of a data item, only that portion has a conflict priority. For example, if particular slides of a presentation are set as guarded, another user can edit other slides that are not set as guarded. Additionally, in some implementations, another user can set one or more guards to other portions of the data item (e.g., different unguarded presentation slides).

FIG. 3 is a flow diagram of an example process 300 for using data guards. For convenience, the process 300 will be described with respect to a system of one or more computing devices that performs the process 300.

The system monitors user behavior 302. For example, the system can determine that a user is frequently modifying a particular data item, e.g., a particular file that the user is actively working on. In some implementations, the system can further determine particular portions of the data item the user is actively working on.

The system specifies a data guard based on the user behavior (304). For example, the system can place a guard on the data item the user is actively working within or the particular actively modified portion of the data item. The data guard can be specified as described above with respect to FIG. 2.

The system provides an indicator representing the guard when presenting the associated data item (306). For example, when presenting a file system interface (e.g., a graphical user interface window) including one or more data items, the representation of data items having associated data guards can include a visual indicator. In some implementations, the visual indicator can be graphic overlying a portion of an icon representation of the data item (e.g., a red dot, or an "X"). In some other implementations, the visual indicator is a change in the presentation of the visual representation of the data item, e.g., color or shading. In some implementations, a pop-up warning or other notification is presented if a user attempts to open a guarded data item or edit the guarded data item.

The system sets a conflict priority based on the data guard (308). The conflict priority can establish a conflict winner that overrides any other conflict resolution processes employed by the system, for example, as described above with respect to FIG. 2.

Figure 4:
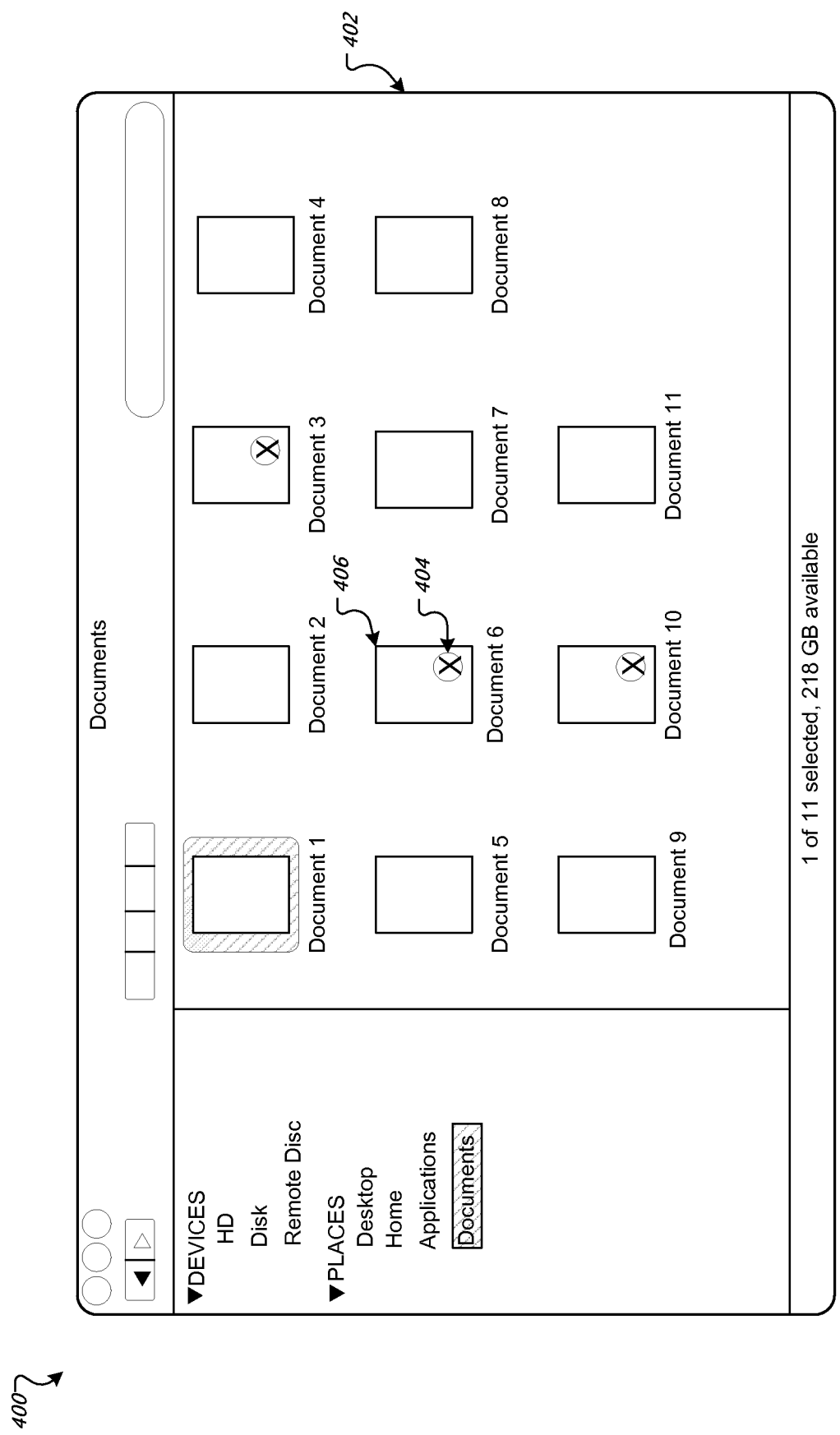
FIG. 4 is an example interface showing file system guards.

FIG. 4 is an example interface 400 showing file system guards. Example interface 400 can be a graphical user interface window. The graphical user interface window can present, for example, file system information, e.g., a directory structure for a hierarchical file system. Data items, e.g., files, folders, can be presented as contents of a particular directory location. The data items can be presented in various forms including lists or icons. In particular, example interface 400 shows a documents directory including documents 402. Documents 402 are represented as respective icons each representing different documents (e.g., word processing documents, spreadsheet documents, presentation documents, etc.). In addition, particular documents include a visual representation of a guard provide notice that the document has had a data guard placed on it by a user. For example, users of another device can set a data guard on a particular document as described above with respect to FIG. 2. The visual representation will be presented on other devices, including those of other users that have access to that document.

In the example interface of FIG. 4, the data guard 404 is shown as a circle with an "X" through it positioned over a portion of a guarded document 406. Other visual representations can be shown, e.g., a red dot, or a change in the color of the icon. The visual representation can notify the user that an entire document is guarded or that at least some portion of the document is guarded. This provides notice to the user that any changes to the guarded data may not be preserved.

Figure 5:
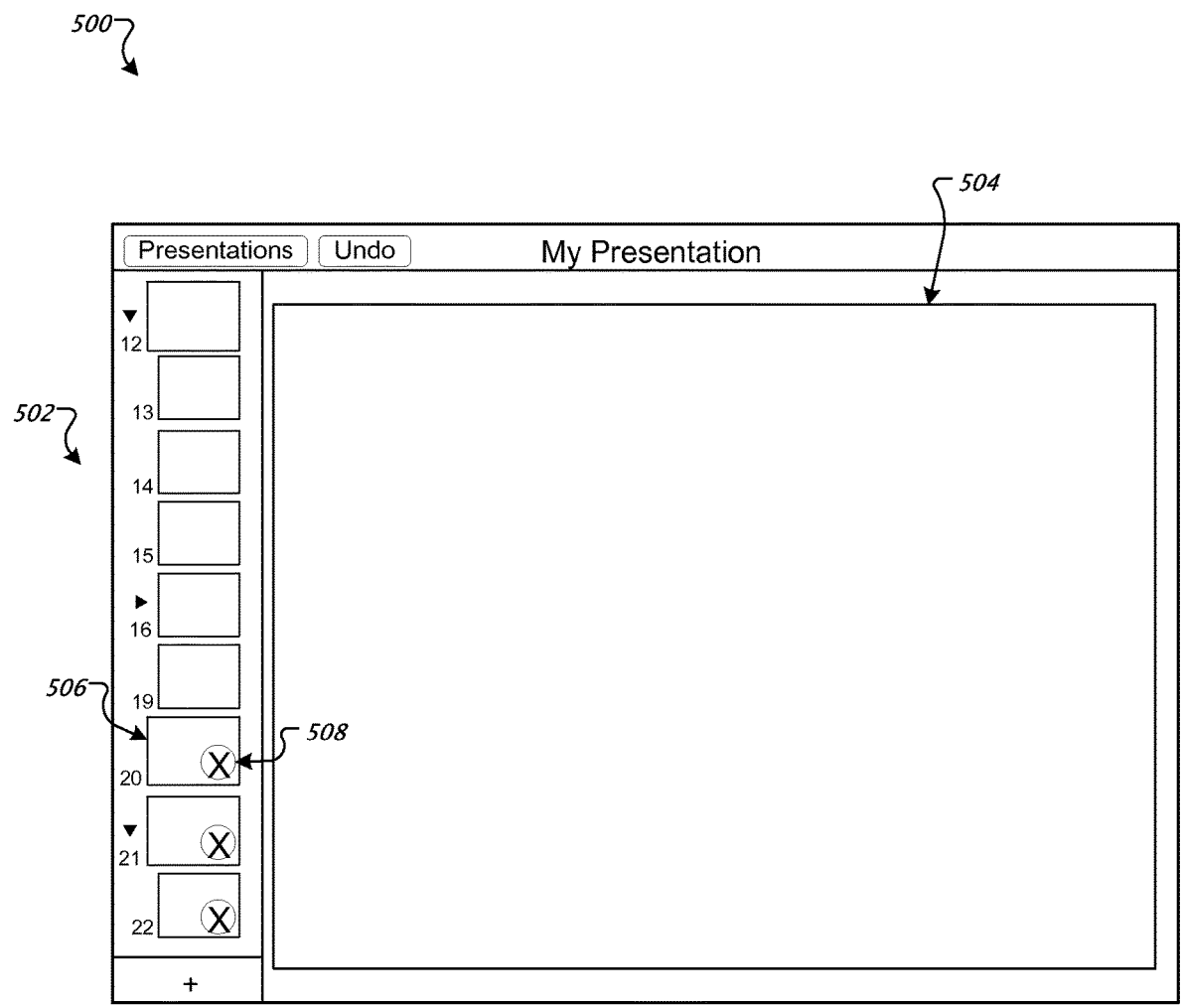
FIG. 5 is an example application interface including data guards.

FIG. 5 is an example application interface 500 including data guards. Example application interface 500 can be a graphical user interface window. The graphical user interface window can present, for example, a user interface for an application. In particular, application interface 500 shows a user interface for a presentation application.

The application interface 500 for a presentation application includes a listing of presentation slides 502 and a region 504 for displaying a currently selected slide. In the example application interface 500, particular slides have been guarded. The individual slides that have a data guard applied include a visual representation indicating that the slide is guarded. For example, slide 506 includes a guard 508. Thus a user can specify one or more slides as guarded (e.g., based on a set of slides that the user is editing). Other users having access to the shared presentation document can modify other unguarded slides. In such cases, the changes will be synchronized. If a conflict occurs with edits to the unguarded slides, an established conflict resolution policy is applied to resolve the conflict. By contrast, if a user edits a guarded slide, the conflict resolution process for guarded data is applied.

Floating Coordinator

A network of computing devices can be logically defined as a group of nodes and edges illustrating communications paths between nodes. In a simple network configuration, nodes can communicate with each other along any path and without priority given to particular communications. While simple to set up, this can result in slower communications between nodes, for example, when synchronizing data.

In some implementations, particular nodes may be better suited for performing actions and/or coordinating communications between nodes for particular tasks. Additionally, a node that may be better suited for one task may not be the best node for another task, e.g., image sharing, movie collaboration, document sharing, etc.

Figure 6A:
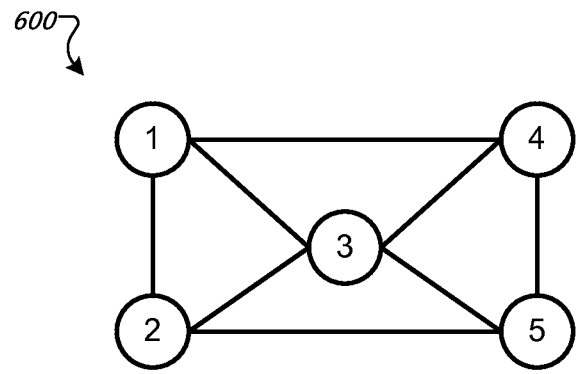
FIGS. 6A-C illustrate example network configurations.
Figure 6B:
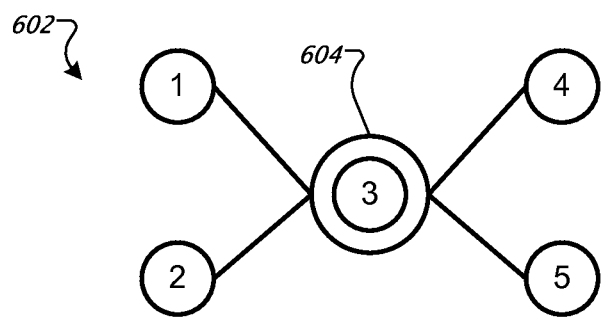
Figure 6C:
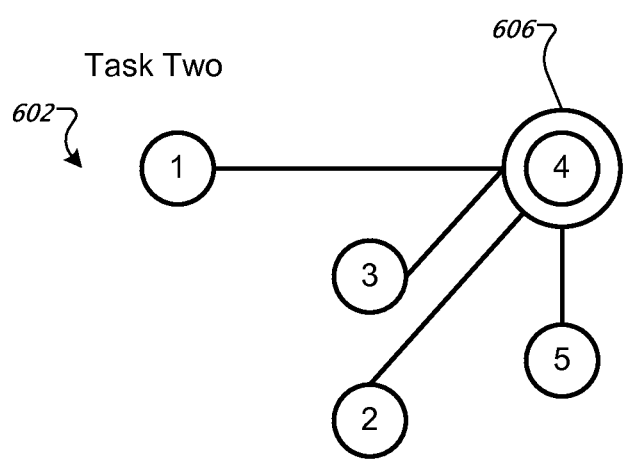

FIGS. 6A-C illustrate example network configurations.

FIG. 6A shows a collection of six nodes 600 communicatively coupled together in a network. Each node can be a particular computing device, e.g., user devices such as mobile devices, tablet devices or computers as well as network devices such as servers or network addressable storage devices. In the network 600, communications do not have a defined path through the network 600. Additionally, there is no priority given to particular communications.

FIG. 6B shows the collection of six nodes 602 in which a particular node has been established as a coordinator for a first task "task one." In particular, node three has been designated the coordinator node 604. As such, the nodes have been logically arranged such that communications for task one are routed through the coordinator node 604. Different logical arrangements can be created for different tasks having different coordinator nodes. For example, FIG. 6C shows the collection of six nodes 602 in which a different node has been established as a coordinator for a second task "task two." In particular, node four has been designated the coordinator node 606. As such, the nodes have been logically arranged such that communications for task one are routed through the coordinator node 606.

Figure 7:
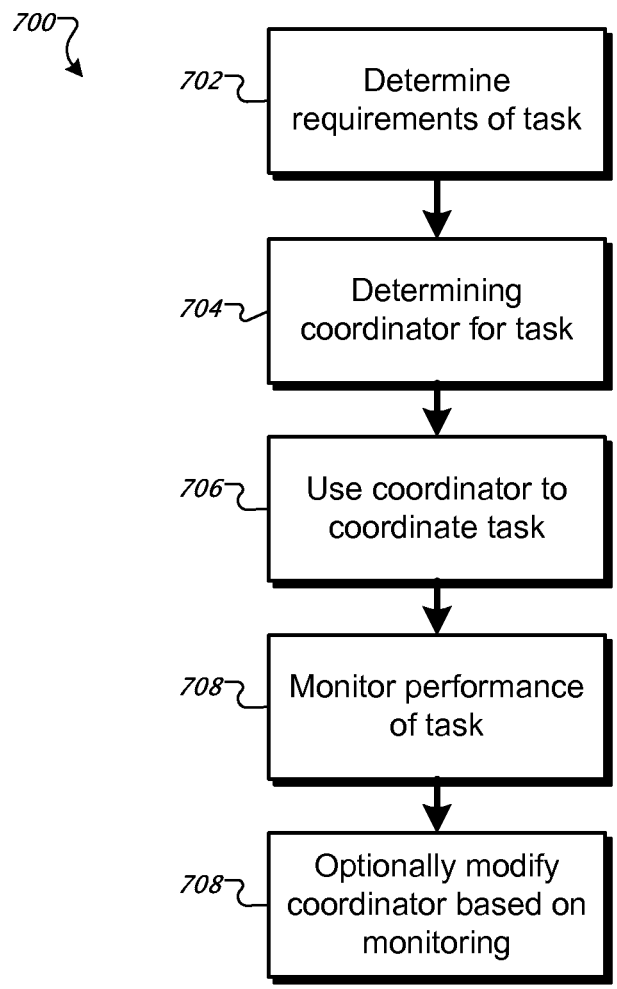
FIG. 7 is a flow diagram of an example process for setting a coordinator node in a network.

FIG. 7 is a flow diagram of an example process 700 for setting a coordinator node in a network. For convenience, the process 700 will be described with respect to a system of one or more computing devices that performs the process 700.

The system determines requirements to perform a task (702). The task can be a particular network task in which network coordination is desired. The task can be, for example, image sharing, document sharing, movie collaboration, or other collaborative or synching activities between networked devices. Different kinds of tasks may require different resources to coordinate. For example, a task may require particular storage, speed, or processing requirements for the coordinating node. In some implementations, particular software requirements may also be needed to perform a particular task.

The system determines a coordinating node for the task (704). The system determines the coordinating node based on the determined requirements. The coordinating node is a particular networked device that is designated as the logical "center" for the network with respect to that task. For example, the devices can be logically arranged into a star structure of nodes with the coordinating node in the center.

The system uses the coordinating node to coordinate activities associated with the second task between the nodes (706). The coordinating node coordinates the flow of data between the nodes that is associated with the task, e.g., synchronization, messaging, etc. The coordinating node can identify a best path, source, etc. for communication between devices. For example, a node may require particular data but not know which node has the data. The node can contact the coordinator to identify the location of the data.

The system monitors performance of the task (708). For example, the coordinating node may have storage limits that are reached, hindering the ability to perform the task. Other resources of the coordinating node may also have limits that can be reached or exceeded by the ongoing task requirements. Further, in some cases, the coordinating node may fail and become unavailable.

The system optionally modifies the coordinator based on the monitoring (710). For example, when the resources of the coordinating node are no longer able to meet requirements of the task, the system can assign a new coordinating node for performing the task. The new coordinating node becomes the logical center and manages the task activities.

Different tasks can be performed by different coordinating nodes concurrently. Thus, a given node may be the coordinating node for some tasks but not others. In each case, the coordinating node is the logical center of the nodes and manages activities (e.g., communications between nodes) for a specific assigned task or tasks.

In some implementations, different applications have their own coordinating node. Thus, the coordinating node can be application specific. Additionally, an application can have more than one coordinating node depending on the application tasks. For example, a movie application may have a first set of requirements for performing a tasks of group editing of the movie. However, later distribution of the movie for review may require a different coordinating node due to the different nature of the task.

Asynchronous Commit

Figure 8:
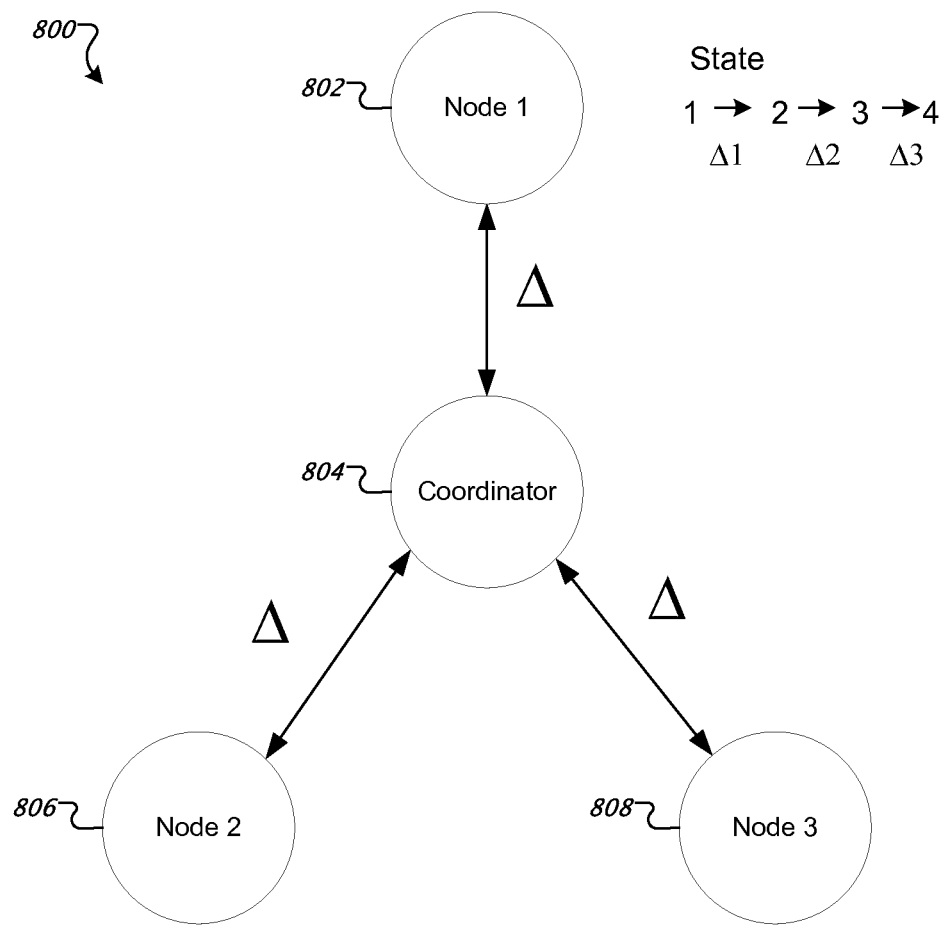
FIG. 8 is a diagram of an example of asynchronous propagation of changes.

FIG. 8 is a diagram 800 of an example of asynchronous propagation of changes. When a system state changes with respect to data that is synchronized, a delta is generated. The state change can be, for example, a change to a file, application settings, and so on. The delta identifies the change, e.g., file data that is changed. Each change builds off the previous change. Thus, if a first change from a first state to a second state results in a first delta, Δ1, a subsequent change from the second state to a third state results in a second delta, Δ2, relative to the second state and not the first state.

FIG. 8 shows a coordinator node 804 as well as a first node 802, a second node 806, and a third node 808. As discussed above, the coordinator node 804 manages communications between nodes, e.g., overall or for a particular task. Thus, the first node 802 sends a change delta to the coordinator node 804 which then distributes the change delta to the second node 806 and the third node 808. Similarly, changes from the second node 806 and third node 808, respectively, are sent to the coordinator node 804 for synchronization with other nodes. In some implementations, the coordinator node 804 is the same for all synchronization activities. However, in some other implementations, as described above, a different node can be the coordinator for different tasks.

The coordinator node 804 manages conflicts between state change deltas. For example, if the first node 802 sends a change delta to the coordinator node 804 indicating a change in state from state 1 to state 2, there is some delay before this is propagated to all other nodes. If another state change delta arrives from another node prior to this synchronization, there may be a conflict. If there is a conflict, the coordinator node 802 will not allow the subsequent state change until all state changes are up to date across the nodes.

Individual nodes do not need to wait for synchronization to make changes, but those changes may be overridden if they conflict with earlier changes. For example, the first node 802 can subsequently send additional change deltas indicating one or more subsequent changes in state, e.g., based on a user actively editing a document. The first node 802 can send these deltas as they are generated to the coordinator node 804. The first node 802 does not need to wait for synchronization between nodes to occur before making further changes and sending subsequent change deltas. The coordinator node 804, however, is responsible for determining which change deltas to synchronize such that, while there may be temporary differences in state among the nodes, e.g., asynchronous nodes, they are all eventually synchronized to the same state.

Figure 9:
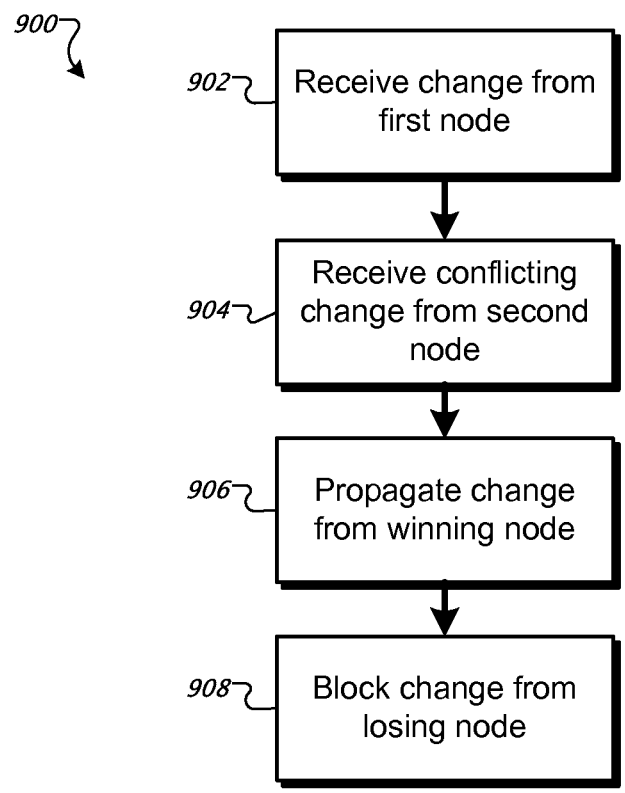
FIG. 9 is a flow diagram of an example process for propagating changes between nodes.

FIG. 9 is a flow diagram of an example process 900 for propagating changes between nodes. For convenience, the process 900 will be described with respect to a system of one or more computing devices that performs the process 900, for example, the coordinator node 804 of FIG. 8.

The system receives a change delta from a first node (802). The system receives a conflicting change delta from a second node (802). A conflict can exist based on a change to the same file, for example. In some other implementations, a finer grained conflict determination can be made as described in greater detail below. When a conflict is detected, the system determines which change has precedence. In some implementations, the first received change has precedence. In some other implementations, the change with an earliest timestamp has precedence. In yet other implementations, the change with precedence is determined based on one or more conflict rules, e.g., based on particular privileges or application of guards as described above.

The change for the conflict winner is propagated by the coordinator node to each other node with which the data is synchronized (906). Additionally, the change of the conflict loser is blocked and is not propagated (908). In some implementations, a notification is sent to the originating node indicating that the change is in conflict with another change. A user at that node may have the option of separately saving the change, e.g., separately saving their changes to a file as a new file.

Global Undo/Redo

Figure 10:
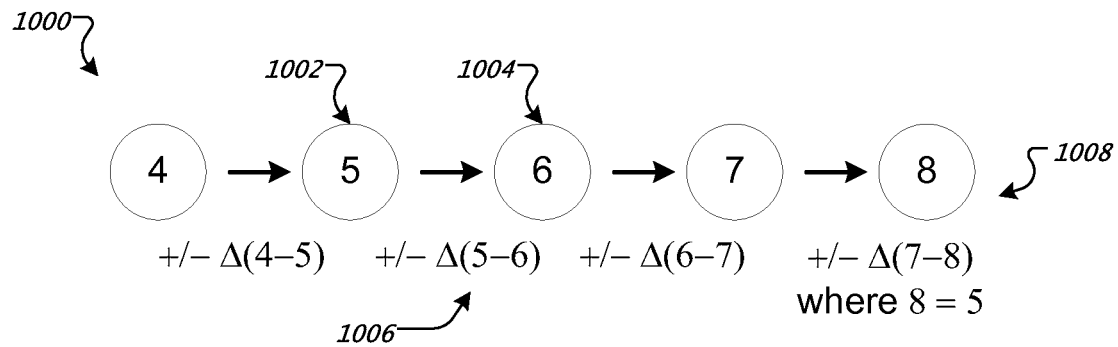
FIG. 10 is a diagram of example state changes.

FIG. 10 is a diagram 1000 of example state changes at a node. The state changes can represent, for example, edits to one or more files, changes to preferences or other application settings, and the like. As shown in FIG. 10, the state changes successively from state 4 to state 8. For each state change, both a positive and negative delta tuple is created. In particular, a change in state from state 5 (1002) to state 6 (1004) results in a positive and negative delta 1006. The positive delta represents the change from state 5 to state 6. The negative delta represents the reversal from state 6 to state 5. Thus, the negative delta can be used to take a step back and restore the prior state.

As shown in FIG. 10, the change from state 7 to state 8 (1008) is actually a return to state 5 (1002). Thus, the change in state is to restore the state back three states. The individual negative deltas are used to increment back from state 7 to state 6 and to state 5. The positive and negative delta from state 7 to state 8 identifies the change from state 7 to state 8 and the restoration from state 8 back to state 7. Thus, a prior state of a node can be restored by walking back the incremental negative deltas. Each of the positive and negative delta tuples is sent to the coordinator. As such, with a set of synchronized nodes, a user of any node can use the center to access the state lineage and restore a particular state across the network. Similarly, since a restoration of a state is considered a new state changed from the prior state, it the same process can be used to redo the changes.

Figure 11:
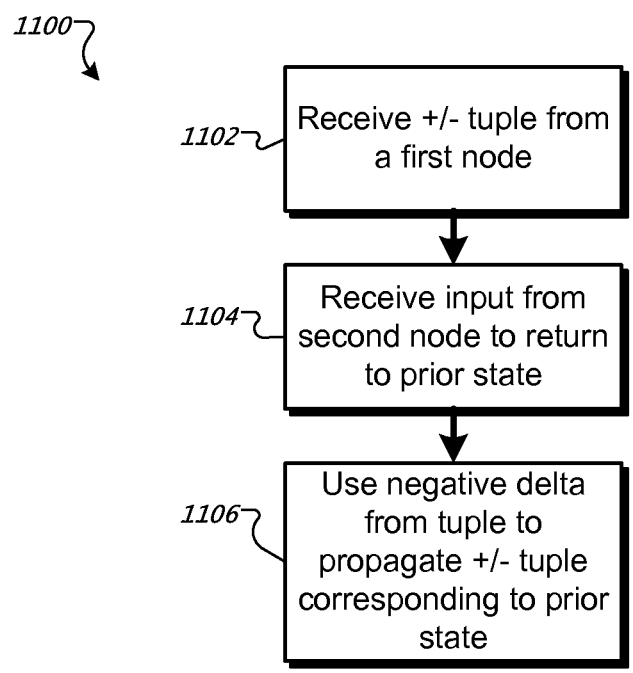
FIG. 11 is a flow diagram of an example process for undoing incremental changes.

FIG. 11 is a flow diagram of an example process 1100 for undoing incremental changes. For convenience, the process 1100 will be described with respect to a system of one or more computing devices that performs the process 1100, for example, the coordinator node 804 of FIG. 8.

The system receives a positive/negative delta tuple from a first node 1102. In some implementations, the system is the coordinator node and propagates the positive/negative tuple to other nodes in communication with the coordinator node. For example, the received change can be associated with an edit to a file. The positive delta identifies the edit made. The negative delta allows the edit to be undone. The coordinator node propagates the tuple so that the file on each node is synchronized.

The system receives an input from a second node to return to a prior state 1104. For example, the user of another node can decide to edit the file to return to the prior state of the file. The coordinator receives all of the negative delta changes and as such each received change can be undone using one or more negative deltas.

The system uses negative delta from tuple to propagate a positive/negative tuple that corresponds to the prior state 1106. The system can then be synchronized to the incremented state that actually corresponds to a prior state.

Dependency Aware Conflict Detection

Figure 12:
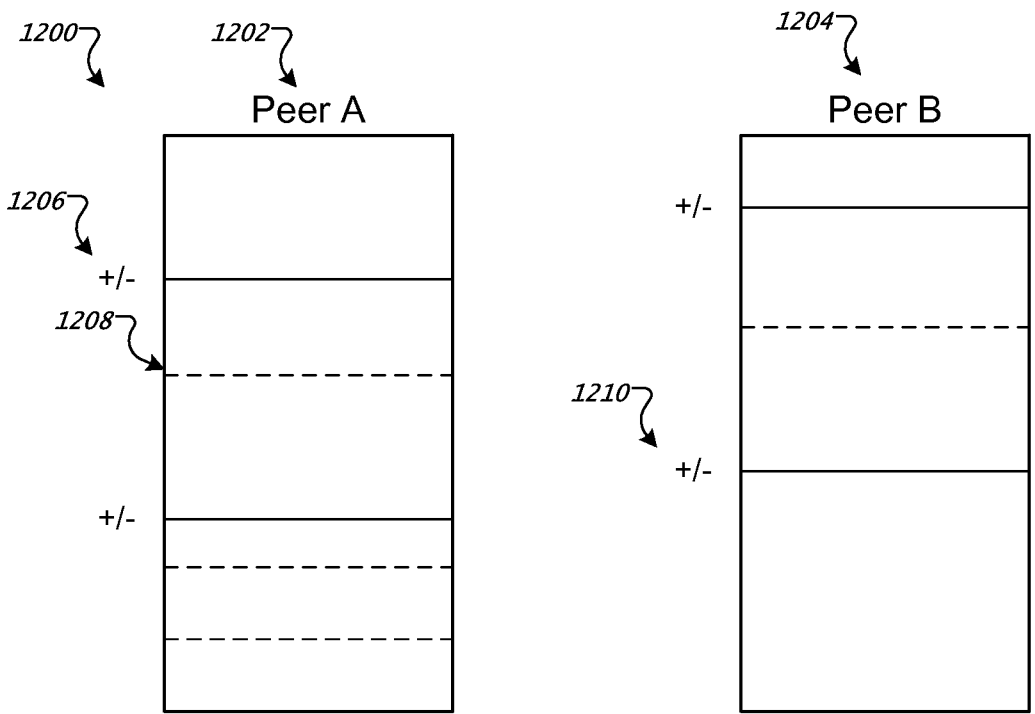
FIG. 12 is a diagram of respective data representations showing changes.

FIG. 12 is a diagram 1200 of respective data representations showing changes. In particular, FIG. 12 shows a data representation from a first peer node 1202 and a data representation from a second peer node 1204. Each peer node can be, for example, different devices between which data is shared. The data representations can be, for example, representation of a particular shared file between the peer nodes 1202 and 1204. Each data representation indicates not only the changes made, but also their relative positions within the data. For example, an edit 1206 is shown for the first peer node 1202. Similarly another edit 1210 is shown in peer node 1204. Each change can correspond to a particular positive/negative delta as described above.

These change points can represent an edit to a particular portion of a data item. For example, a change to a particular slide of a presentation file, particular row of a spreadsheet document, or a particular portion of a document. Each of the data representations can be sent to a coordinator node. The coordinator node can determine if there is a conflict between the changes from each peer node.

As discussed above, a conflict between changes can be at a coarse level based on a change to a given data item. Thus, if two changes are received by the coordinator node to the same file before synchronization, a conflict can be determined. However, finer conflict determination can be performed. For example, if the user of peer node 1202 has edited a first slide of a presentation application and the user of peer node 1204 has edited the tenth slide of the presentation application, these two changes are not in conflict and can be merged together. The respective data representations showing the locations of changes allows the coordinator node to determine whether the changes are to the same portion of data item and therefore in conflict.

In some further implementations, as show in FIG. 12, the data representations can also indicate particular dependencies. For example, the data representation for peer node 1202 includes an indicator of a dependency 1208. Because of the dependency, a change to the dependency would also result in a conflict. For example, a spreadsheet document can include fields that are dependent upon the contents of other fields (e.g., based on formulas). Thus, the conflict determination can further account for dependencies present in the data item to ensure that different changes received from different nodes are not in conflict.

Figure 13:
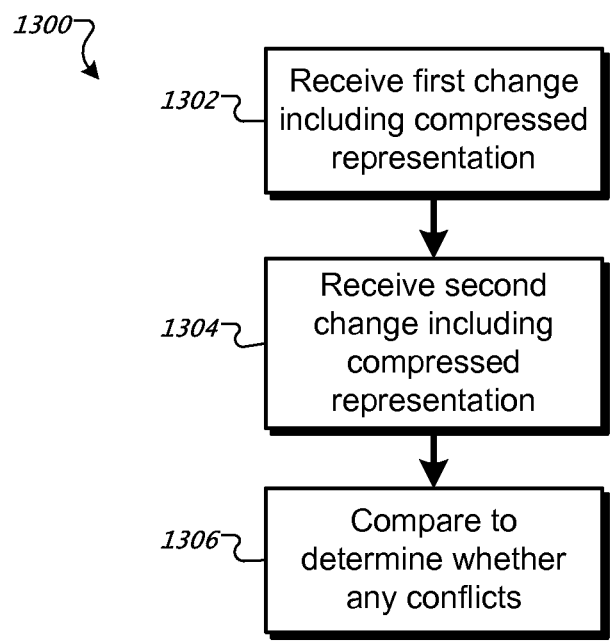
FIG. 13 is a flow diagram of an example process for conflict detection.

FIG. 13 is a flow diagram of an example process 1300 for conflict detection. For convenience, the process 1300 will be described with respect to a system of one or more computing devices that performs the process 1300, for example, the coordinator node 804 of FIG. 8.

The system receives a first change including a compressed representation of a data item 1302. The compressed representation of the data item includes an identification of the locations of one or more changes to the data item as well as any dependencies.

The system receives a second change including a compressed representation of the data item 1304. The compressed representation of the data item includes an identification of the locations of one or more changes to the data item as well as any associated dependencies.

The system compares the compressed representations to determine whether any conflicts exist 1306. A conflict can exist because of changes to overlapping portions of the data item as well as due to changes affecting dependencies. If a conflict exists, the system determines a conflict winner according to conflict resolution rules. The changes of the conflict winner are synchronized among the nodes. If no conflict exists, the changes can be merged and propagated to the nodes. Alternatively, the changes can be separately synchronized such that both received changes are propagated to all nodes.

Portable Volumes

Figure 14:
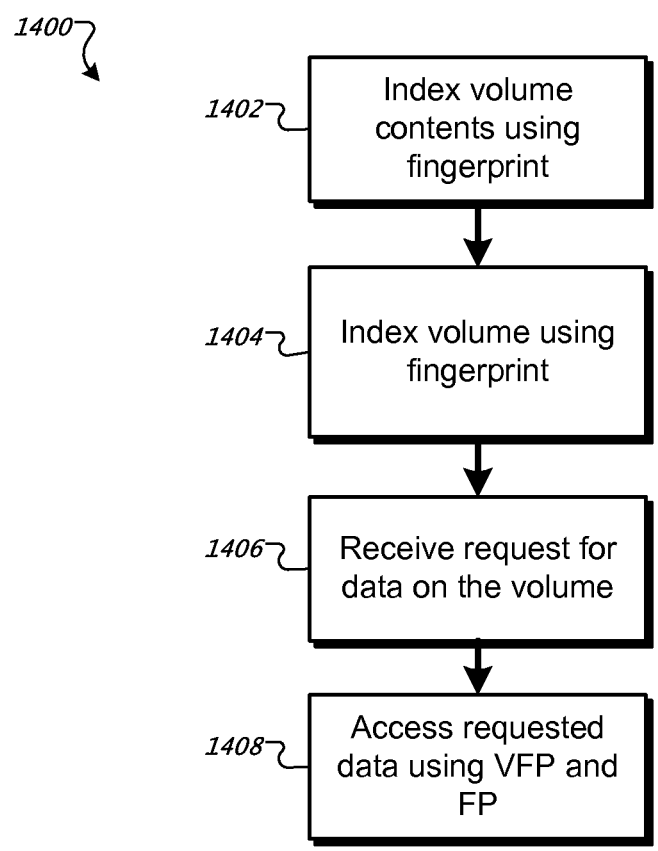
FIG. 14 is a flow diagram of an example process for using volume fingerprints.

FIG. 14 is a flow diagram of an example process 1400 for using volume fingerprints. For convenience, the process 1400 will be described with respect to a system of one or more computing devices that performs the process 1400.

The system indexes contents of a volume using fingerprints 1402. The volume can be a portable storage volume, e.g., a flash or thumb drive or external hard drive, or a fixed storage volume. The various contents of the storage volume can each be indexed according to respective fingerprints. Thus, a given data item in the storage volume, e.g., a particular file, can be identified by its fingerprint in the index. A data item can be identified across a network of coupled nodes based on the fingerprint. For example, a user of one device can request access to another document residing in a storage volume on another device using the fingerprint. Each fingerprint can be generated using a hash function or other suitable technique.

The system indexes the volume using a volume fingerprint 1404. This allows the volume to be addressable according to a particular unique fingerprint. As such, the location of the volume is not necessarily fixed in the network. For example, if the storage volume is a thumb drive, the thumb drive can be addressable at any location within the network based on the volume fingerprint.

The system receives a request for data on the storage volume 1406. The request can identify the location of the data based on the volume fingerprint (VFP) and the data item fingerprint (FP). For example, the system can receive a request that includes a tuple of VFP-FP identifying the particular volume and the particular data item stored on that volume.

The system access the requested data using volume fingerprint and item fingerprint 1408. The system uses the volume fingerprint to identify the particular storage volume on the network. The data item fingerprint can then be used to identify the particular data item using the volume index. The accessed item can be provided, for example, to a requesting node.

Figure 15:
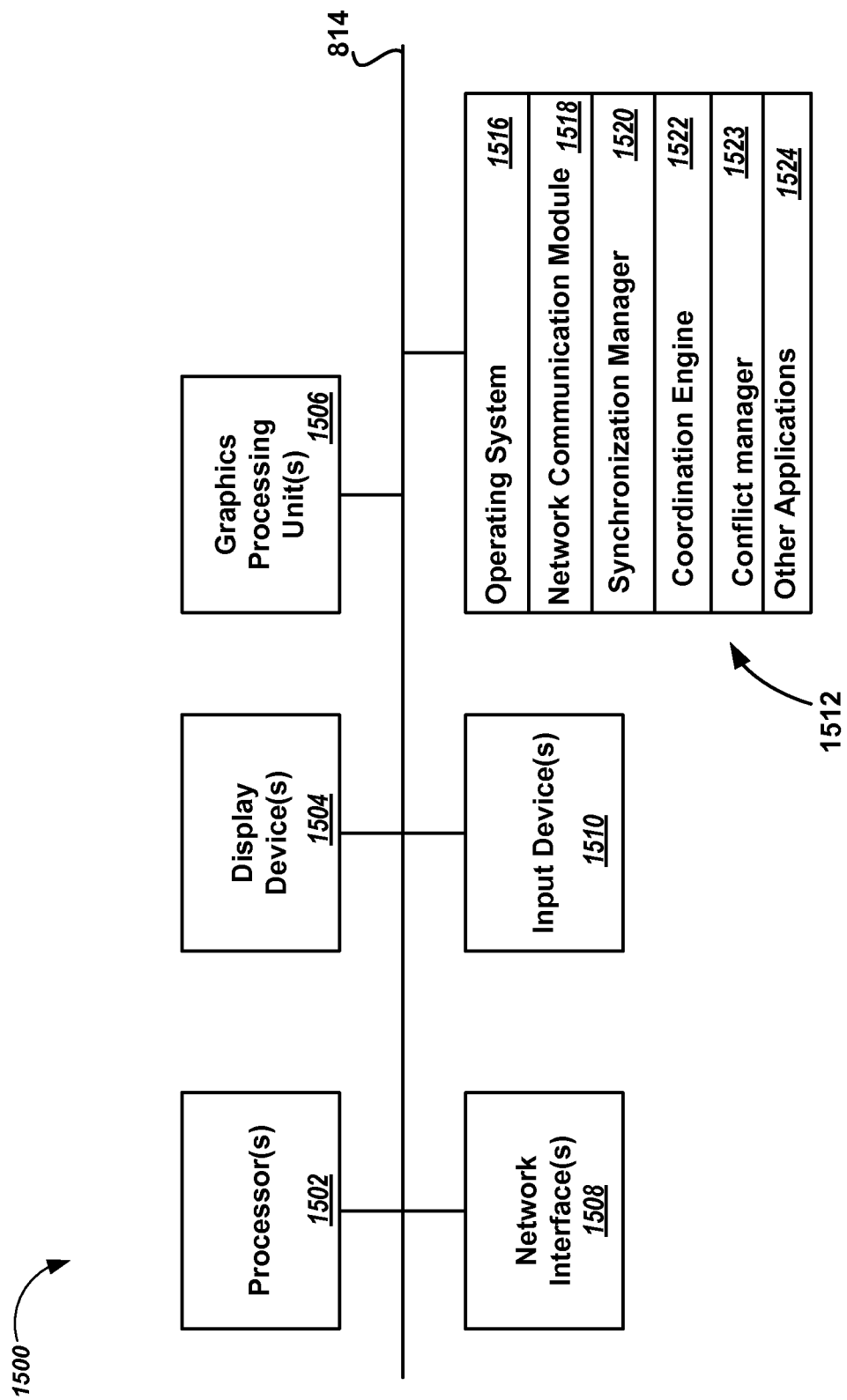
FIG. 15 is an example system.

FIG. 15 is an example system architecture 1500. The system architecture 1500 is capable of performing operations for performing data management. The architecture 1500 includes one or more processors 1502 (e.g., IBM PowerPC, Intel Pentium 4, etc.), one or more display devices 1504 (e.g., CRT, LCD), graphics processing units 1506 (e.g., NVIDIA GeForce, etc.), a network interface 1508 (e.g., Ethernet, FireWire, USB, etc.), input devices 1510 (e.g., keyboard, mouse, etc.), and one or more computer readable mediums 1512. These components exchange communications and data using one or more buses 1514 (e.g., EISA, PCI, PCI Express, etc.).

The term "computer-readable medium" refers to any medium that participates in providing instructions to a processor 1502 for execution. The computer-readable medium 1512 further includes an operating system 1516 (e.g., Mac OS®, Windows®, Linux, etc.), a network communication module 1518, a synchronization manager 1520, a coordination engine 1522, a conflict manager 1523, and other applications 1524.

The operating system 1516 can be multi-user, multiprocessing, multitasking, multithreading, real-time and the like. The operating system 1516 performs basic tasks, including but not limited to: recognizing input from input devices 1510; sending output to display devices 1504; keeping track of files and directories on computer-readable mediums 1512 (e.g., memory or a storage device); controlling peripheral devices (e.g., disk drives, printers, etc.); and managing traffic on the one or more buses 1514. The network communications module 1518 includes various components for establishing and maintaining network connections (e.g., software for implementing communication protocols, such as TCP/IP, HTTP, Ethernet, etc.).

The synchronization manager 1520, coordination engine 1522, and conflict manager 1523 provide various software components for performing the various functions for performing data management tasks as described with respect to FIGS. 1-14.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   in a computing device, performing operations for:
   identifying from an input of a first user, one or more portions of a particular data item to be data guarded by determining from the input of the first user that the first user is actively editing the one or more portions of the particular data item, wherein the one or more portions of the particular data item are less than a whole of the particular data item, wherein the particular data item comprises a word processing document, a spreadsheet document, or a presentation document, wherein the input of the first user to identify the one or more portions of the particular data item to be data guarded comprises explicit specification of the one or more portions of the particular data item to be data guarded;
   in response to identifying the one or more portions of the particular data item, automatically generating a data guard for the one or more portions of the particular data item based on determining that the first user is actively editing the one or more portions of the particular data item, where the data guard prevents concurrent modification of the one or more portions of the particular data item by users other than the first user, wherein a remainder of the particular data item that is unguarded by the data guard is viewable to, and editable by, the users other than the first user;
   causing visual display of an indicator on a display in association with the one or more portions of the particular data item, wherein the indicator indicates that the one or more portions of the particular data item are guarded by the data guard; and
   while the one or more portions of the particular data item are guarded by the data guard:
   receiving, from a second user, one or more inputs indicating changes to make to the one or more portions of the particular data item; and
   preventing the changes to the one or more portions of the particular data item.

2. The method of claim 1, wherein visually identifying the one or more portions of the particular data item as guarded by displaying the indicator representing the data guard in association with the one or more portions of the particular data item comprises:
   displaying a graphic overlaying a portion of an icon representing the one or more portions of the particular data item.

3. The method of claim 1, wherein visually identifying the one or more portions of the particular data item as guarded by displaying the indicator representing the data guard in association with the one or more portions of the particular data item comprises:
   changing a presentation of an icon representing the particular data item from a normal presentation to a guarded presentation.

4. The method of claim 1, comprising setting a conflict priority by configuring the particular data item so that one or more users are prevented from making changes to the particular data item.

5. A non-transitory computer-readable storage medium storing instructions that, when executed by a computing device, cause the computing device to perform a method, the method comprising:
   identifying from an input of a first user, one or more portions of a particular data item to be data guarded by determining from the input of the first user that the first user is actively editing the one or more portions of the particular data item, wherein the one or more portions of the particular data item are less than a whole of the particular data item, wherein the particular data item comprises a word processing document, a spreadsheet document, or a presentation document, wherein the input of the first user to identify the one or more portions of the particular data item to be data guarded comprises explicit specification of the one or more portions of the particular data item to be data guarded;
   in response to identifying the one or more portions of the particular data item, automatically generating a data guard for the one or more portions of the particular data item based on determining that the first user is actively editing the one or more portions of the particular data item, where the data guard prevents concurrent modification of the one or more portions of the particular data item by users other than the first user, wherein a remainder of the particular data item that is unguarded by the data guard is viewable to, and editable by, the users other than the first user;
   causing visual display of indicator on a display in association with the one or more portions of the particular data item, wherein the indicator indicates that the one or more portions of the particular data item guarded by the data guard; and
   while the one or more portions of the particular data item are guarded by the data guard:
      receiving, from a second user, one or more inputs indicating changes to make to the one or more portions of the particular data item; and
      preventing the changes to the one or more portions of the particular data item.

6. The non-transitory computer-readable storage medium of claim 5, wherein visually identifying the one or more portions of the particular data item as guarded by displaying the indicator representing the data guard in association with the one or more portions of the particular data item comprises:
   displaying a graphic overlaying a portion of an icon representing the particular data item.

7. The non-transitory computer-readable storage medium of claim 5, wherein visually identifying the one or more portions of the particular data item as guarded by displaying the indicator representing the data guard in association with the one or more portions of the particular data item comprises:
   changing a presentation of an icon representing the one or more portions of the particular data item from a normal presentation to a guarded presentation.

8. The non-transitory computer-readable storage medium of claim 5, comprising setting a conflict priority by configuring the particular data item so that one or more users are prevented from making changes to the particular data item.

9. The method of claim 1, further comprising:
   creating a new version of the particular data item based on the one or more inputs.

10. The method of claim 1, further comprising:
    discarding the one or more inputs.

11. The non-transitory computer-readable storage medium of claim 5, wherein the method further comprises creating a new version of the particular data item based on the one or more inputs.

12. The non-transitory computer-readable storage medium of claim 5, wherein the method further comprises discarding the one or more inputs.

13. The method of claim 1, wherein the particular data item comprises a presentation document, and the one or more portions of the particular data item comprise one or more slides of the presentation document.

14. The non-transitory computer-readable storage medium of claim 5, wherein the particular data item comprises a presentation document, and the one or more portions of the particular data item comprise one or more slides of the presentation document.

15. The method of claim 1, wherein the particular data item comprises a spreadsheet document.

16. The non-transitory computer-readable storage medium of claim 5, wherein while the one or more portions of the particular data item are guarded by the data guard, the method comprises:
    receiving, from the second user, one or more inputs indicating changes to make to within the remainder of the particular data item;
    identifying, based on the one or more inputs indicated changes to make within the reminder of the particular data item, at least a portion of the remainder to be data guarded; and
    in response to identifying the at least a portion of the remainder, generating a second data guard for the at least a portion of the remainder, where the second data guard prevents concurrent modification of the at least a portion of the remainder by users other than the second user.

17. The non-transitory computer-readable storage medium of claim 5, wherein generating the data guard for the one or more portions of the particular data item comprises automatically generating the data guard in response to receiving the input of the first user.

18. The method of claim 1, further comprising, while the one or more portions of the particular data item are guarded by the data guard, causing visual display of a notification on the display in response to a user input of the second user indicative of a selection of the one or more portions of the particular data item, wherein the notification is indicative of the one or more portions being guarded by the data guard.

* * * * *